United States Patent Office 3,669,641
Patented June 13, 1972

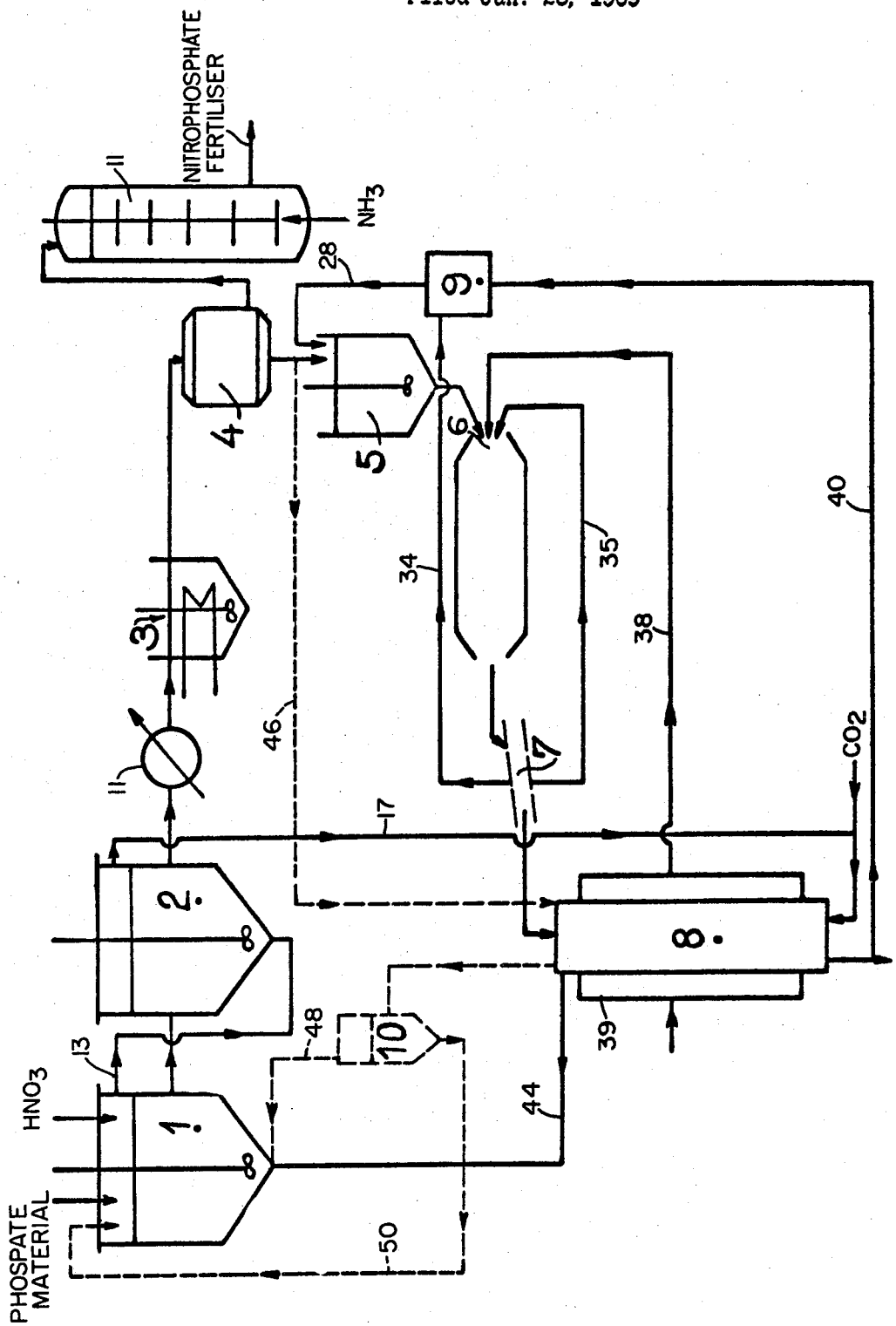

3,669,641
PRODUCTION OF COMPLEX NITROPHOSPHATE FERTILISERS
Robert Copin, Sailly-la-Bourse, and Robert Sinn and Charles Bouilly, Bully-les-Mines, France, assignors to Societe Chimiques des Charbonnages, Paris, France
Filed Jan. 28, 1969, Ser. No. 794,700
Claims priority, application France, Feb. 1, 1968, 138,335
Int. Cl. C05b 11/06
U.S. Cl. 71—35     3 Claims

ABSTRACT OF THE DISCLOSURE

Process for the production of nitrophosphate fertilisers which comprises:
(i) Digesting calcium phosphate with aqueous nitric acid in the presence of recycled nitrogen oxide-containing gas,
(ii) Cooling the solution obtained by digestion to crystallise calcium nitrate tetrahydrate,
(iii) Separating the crystallised calcium nitrate tetrahydrate,
(iv) Processing the mother liquor to form a nitrophosphate fertiliser therefrom,
(v) Thermally decomposing the separated calcium nitrate in the presence of calcium carbonate and of the off-gas from the digestion step (i), said off-gas containing carbon dioxide which has been added thereto, and
(vi) Recycling the nitrogen oxide-containing off-gas from the decomposition step (v) to the digestion step (i).

This invention is concerned with a process for the production of complex nitrophosphate fertilisers.

The digestion of naturally-occurring calcium phosphates with nitric acid gives a solution containing principally calcium nitrate, phosphoric acid and nitric acid. The direct production of fertiliser from this solution (by neutralisation with ammonia, concentration and granulation) is not desirable since the fertiliser thus obtained still contains calcium nitrate which is a very hygroscopic material and which rapidly leads to caking of the whole mass so that the fertiliser cannot be stored. In addition, in such a fertiliser, all the $P_2O_5$ is in the form of water-insoluble calcium phosphate which is not acceptable in all districts or regions.

In order to overcome these disadvantages, it is usual to remove part of the calcium nitrate from the solution obtained by the acid digestion by cooling the latter and thus crystallising calcium nitrate tetrahydrate, which is separated from the crystallisation mother liquor in a separator. The mother liquor is then neutralised with ammonia, concentrated, and treated, if desired, with a potassium salt; the thick liquid or pulp thus obtained is granulated and the grains then dried to give a complex nitrophosphate fertiliser having generally satisfactory storage properties and in which a part of the $P_2O_5$ is water soluble.

The calcium nitrate tetrahydrate obtained from the separator is fused and converted into ammoniated calcium nitrate. The latter has a nitrogen content of 15 to 15.5% and is sold as a nitrogenous fertiliser, but its low nitrogen content makes its commercialisation difficult.

We have now developed an improved process for the production of complex nitrophosphate fertilisers from naturally-occurring calcium phosphates.

According to the present invention, we provide a process for the production of nitrophosphate fertilisers, which comprises
(i) Digesting a naturally-occurring calcium phosphate with aqueous nitric acid in the presence of a gas containing one or more nitrogen oxides,
(ii) Cooling the solution obtained by digestion to crystallise at least a part of the calcium nitrate contained therein as calcium nitrate tetrahydrate,
(iii) Separating the crystallised calcium nitrate tetrahydrate,
(iv) Processing the mother liquor to form a nitrophosphate fertiliser therefrom,
(v) Thermally decomposing the separated calcium nitrate tetrahydrate in the presence of the off-gas from the digestion step (i), and
(vi) Recycling the nitrogen oxide-containing off-gas from the decomposition step (v) to the digestion step (i).

The processing of the mother liquor from which the calcium nitrate tetrahydrate crystals have been separated, to form a nitrophosphate fertiliser, may be carried out by conventional procedures as described above, that is by neutralising the mother liquor with ammonia, concentrating the neutralised solution, adding, if desired, a potassium salt, and granulating the resulting mixture.

In carrying out the process according to the invention, it is preferred to add carbon dioxide to the off-gas from the digestion step before the latter is passed to the decomposition step. The decomposition step is preferably carried out in the presence of calcium carbonate.

One of the characteristics of the process according to the invention is that smaller quantities of nitric acid are consumed than in known processes as described above. Thus the consumption is generally from 0.2 to 1.3 moles of nitric acid per mole of calcium oxide in the phosphate material treated, as compared with generally 2 moles of nitric acid per mole of calcium oxide for known processes. In addition, in the present process the concentration of the nitric acid is preferably less than 55%, which is not the case with known processes; to make a fertiliser having 50% water-soluble $P_2O_5$ and 50% ammonium citrate-soluble $P_2O_5$, nitric acid having a concentration of from 10 to 50%, and more particularly of approximately 35%, is advantageously used. Thus the process of this invention enables nitric acid-producing units to be used which produce a more dilute acid than could be used hitherto and this constitutes an appreciable industrial advantage.

A preferred form of the process and plant suitable for carrying it out will now be described, by way of illustration, with reference to the single figure of the accompanying drawing which is a flow sheet representing the plant.

The phosphate starting material and nitric acid having a concentration of from 10 to 50% are continuously introduced into a reactor 1 together with a gaseous mixture rich in nitrogen oxides coming from a later stage of the process (the $Ca(NO_3)_2 \cdot 4H_2O$ decomposition stage) The digestion of the phosphate is effected principally in the reactor 1 and is completed in a second reactor 2 connected in series with the reactor 1. The gas leaving the reactor such as by a conduit 13 is passed through the contents of the reactor 2.

The temperature in the reactor 1 is from 20 to 60° C., and advantageously from 30 to 40° C., while that in the reactor 2 is from 20 to 90° C., and advantageously from 40 to 60° C. The gaseous mixture leaving the reactor 2 is passed to reactor 8 such as by conduit 17 and is thereafter recycled through conduit 44 to the reactor 1 after elimination of the fluorine-containing compounds (HF, Si) from this gas.

The solution leaving the reactor 2 is rapidly cooled (in order to restrict the evolution of gases) to a temperature of about 30° C., by cooler 11 and is then subjected to slow cooling in a crystalliser 3. The resulting cold solution charged with $Ca(NO_3)_2 \cdot 4H_2O$ crystals is separated in a separator 4. The mother liquor of crystallisation discharged from the separator 4 is neutralised with ammonia, suitably in a tower 11, has added to it, if desired, a potassium salt, and is concentrated and granulated (not shown).

The $Ca(NO_3)_2 \cdot 4H_2O$ crystals discharged from the separator 4 are melted at a temperature above 50° C. in a mixer 5 which receives at the same time impure, crushed calcium carbonate coming from a crusher 9. The calcium carbonate is transmitted to crusher 9 from the decomposition reactor 8 by means of conveyor 40. The weight ratio between the $Ca(NO_3)_2 \cdot 4H_2O$ and the impure calcium carbonate should be about 1:2.

The thick liquid mixture leaving the mixer 5 is dehydrated and granulated in a suitable granulator-drier 6 which can, for example, be a rotating furnace or a furnace provided with an endless screw.

The heat necessary for the dehydration of the thick liquid mixture is provided by the hot exhaust gases (typically about 600° C.) transmitted through conduit 38 from the combustion chamber 39 in which the reactor 8 is located, the combustion chamber being heated by fuel or natural gas. The anhydrous $Ca(NO_3)_2/CaCO_3$ mixture leaving the granulator-drier 6 at a temperature above about 170 C. is graded on a screen 7 to the desired granulometry. The preferred granulometry is a mean particle size of from 1 mm. to 15 mm., preferably from 5 mm. to 10 mm. The grains have a porosity of at least 20% which provides excellent gas/solid contact during the subsequent decomposition step. Undersize particles are recycled through conveyor 35 to the mixer 5 and/or to the granulator-drier 6. Oversize particles are transmitted by means of conveyor 34 to crusher 9 and recycled to the mixer 5. The material having the desired granulometry is passed from the screen 7 to the reactor 8 which is heated to a temperature of from 440 to 750° C.

In the reactor 8, the off-gas transmitted from the reactor 2 through conduit 17, after enrichment with $CO_2$, is passed counter-currently or co-currently with the solid material. The calcium nitrate dispersed in the porous solid material is thus decomposed to form nitrogen oxides (NO, $NO_2$), oxygen and lime which fixes the greater part of the $CO_2$ and the whole of the fluorine-containing compounds contained in the gas coming from the reactor 2.

By operating the reactor 2 at a temperature of about 90° C., the digestion solution can be substantially completely freed of fluorine-containing compounds, these being volatilised at this temperature, and the fluorine-containing compounds contained in the off-gas from the reactor 2 are fixed by reaction with lime in the reactor 8. At a temperature of 90° C., the proportion of nitrogen oxides in the off-gas from the reactor 2 is also increased, but this is not undesirable because this gas is recycled.

The gas rich in nitrogen oxides leaving the reactor 8 is cooled to the temperature of the reactor 1 and then introduced into the latter through conduit 44.

One part of the solid residue in the reactor 8, consisting principally of $CaCO_3$, is passed from the reactor to the crusher 9 by means of conveyor 40 and, after crushing, is recycled to the mixer 5. The other part can be treated in order to recover the fluorine present, before being discarded.

According to a first variant (indicated by dashed lines in the drawing) of the process just described, the molten $Ca(NO_3)_2 \cdot 4H_2O$ or, indeed, an aqueous solution of calcium nitrate, is transmitted from separator 4 such as by conduit 46 and directly sprayed onto a bed of calcium carbonate in the reactor 8. The off-gas from the reactor 8 is cooled rapidly in a condenser 10 and the residual gas phase and the nitrogen oxide-containing liquid phase obtained are introduced separately into the reactor 1 by means of conduits 48 and 50 respectively.

According to a second variant of the process, the enrichment of the off-gas from the reactor 2 with $CO_2$ is not effected and a solution of calcium nitrate is sprayed onto a bed consisting principally of lime. However by not introducing $CO_2$ into the reaction mixture, the latter is deprived of the heat liberated by the carbonation of the lime which furnishes about half the heat necessary for the decomposition of the calcium nitrate.

According to a third variant of the process, almost the whole of the calcium contained in the phosphate starting material is eliminated in the form of calcium nitrate which is then decomposed according to one of the methods described above. This enables the nitric acid requirement of reactor 1 to be reduced. Such substantial elimination of calcium nitrate can be effected by extracting, with an organic solvent which is immiscible or only slightly miscible with water, such as isobutanol, the whole or a part of the nitric and phosphoric acids contained either in the solution discharged from the reactor 2 after the initial cooling thereof or in the mother liquor of crystallization discharged from the separator 4. In the latter case, the aqueous phase leaving the extractor has approximately the same composition as that of a solution used to effect digestion, apart from a high water content. This aqueous phase is, therefore, recycled to the digestion reactors.

In order that the invention may be more fully understood, the following examples are given by way of illustration only. Example 1 illustrates the known process described above, and is given for the purpose of comparison.

EXAMPLE 1

100 kg. Florida calcium phosphate having the following composition, by weight: $P_2O_5$, 31.69%; CaO, 48%; $CO_2$, 3.5% and $SiO_2$, 4%, were digested with 198 kg. of 60% nitric acid at a temperature of 50° C. 3.5 kg. of $CO_2$, 0.5 kg. of a gaseous mixture of $SiF_4$ and HF, 1.6 kg. of $HNO_3$ and 4.8 kg. of $H_2O$ were given off from the digestion reactor.

287.6 kg. of solution were obtained by digestion, this solution containing 140.5 kg. of $Ca(NO_3)_2$, 9.2 kg. of $HNO_3$, 43.7 kg. of $H_3PO_4$, 4.7 kg. of $H_2SiF_6$ and 1.8 kg. of $SiO_2$. The solution was cooled to 12° C. and separation of the crystals formed during cooling gave 130 kg. of calcium nitrate tetrahydrate containing 89.6 kg. of $Ca(NO_3)_2$, 1.1 kg. of $HNO_3$, 1.2 kg. of $H_3PO_4$, 0.2 kg. of $H_2SiF_6$ and 37.2 kg. of $H_2O$, and also 157.6 kg. of mother liquor containing 50.9 kg. of $Ca(NO_3)_2$, 8 kg. of $HNO_3$, 42.5 kg. of $H_3PO_4$, 4.5 kg. of $H_2SiF_6$ and 1.8 kg. of $SiO_2$.

In order to obtain a complex fertiliser having an $N_2/P_2O_5$ weight ratio equal to 1, 25.5 kg. of 60% nitric acid were added to the mother liquor. The mother liquor was then neutralised with 20.5 kg. of $NH_3$. After concentration, granulation and drying, 156.2 kg. of 20-20-0 ($N_2$—$P_2O_5$—$K_2O$) fertiliser were obtained, of which 50% of the $P_2O_5$ was water-soluble and 50% was soluble in ammonium citrate.

EXAMPLE 2

100 kg. of Florida calcium phosphate having the following composition, by weight: $P_2O_5$, 31.69; CaO, 48%; $CO_2$, 3.5%; F, 4.1% and $SiO_2$, 4%, were introduced together with 131 kg. of 36% nitric acid into the reactor 1 of the plant shown in the accompanying drawing. 92 kg. of a gaseous mixture consisting of 57.4 kg. of $NO_2$, 20.5 kg. of $CO_2$, 4 kg. of $H_2O$ and 10 kg. of $O_2$, were simultaneously passed into the reactor 1 which was operated at a temperature of 35° C.

The solution and the gas leaving reactor 1 were recontacted in the reactor 2 which was also operated at 35° C. There were discharged from reactor 2, 287.9 kg. of a solution containing 140.5 kg. of $Ca(NO_3)_2$, 9.2 kg. of $HNO_3$, 43.7 kg. of $H_3PO_4$, 4.7 kg. of $H_2SiF_6$ and 1.8 kg. of $SiO_2$, and 36 kg. of off-gas consisting of 4.2 kg. of NO, 3.3 kg. of $O_2$, 0.5 kg. of a mixture of $SiF_2$ and HF, 24 kg. of $CO_2$ and 4 kg. of $H_2O$.

20.5 kg. of $CO_2$ were added to this off-gas which was then introduced into the decomposition reactor 8 which was operated at 600° C.

The solution discharged from the reactor 2 was cooled to 12° C. and separation of the crystals formed during cooling gave 130 kg. of calcium nitrate tetrahydrate consisting of 89.6 kg. of $Ca(NO_3)_2$, 1.1 kg. of $HNO_3$, 1.2 kg. of $H_3PO_4$, 0.2 kg. of $H_2SiF_6$ and 37.2 kg. of $H_2O$, and also 157.6 kg. of mother liquor identical to that of Example 1.

25.5 kg. of 60% nitric acid were added to this mother liquor which was then neutralised with 20.5 kg. of $NH_3$ and worked up as described in Example 1 to give 156.2 kg. of 20-20-0 fertiliser in which 50% of the $P_2O_5$ was water-soluble and 50% soluble in ammonium citrate.

The 130 kg. of calcium nitrate obtained from the separation stage were introduced in the mixer 5 together with 130 kg. of solid crushed material containing 122.1 kg. of $CaCO_3$, 4.5 kg. of $Ca_3(PO_4)_2$, 2.7 kg. of $CaF_2$ and 0.7 kg. of $SiO_2$. The mixer was operated at 80° C. and from it were discharge 1.4 kg. of $CO_2$ and 258.7 kg. of a thick liquid consisting of 91 kg. of $Ca(NO_3)_2$, 6.4 kg. of $Ca_3(PO_4)_2$, 2.9 kg. of $CaF_2$, 119.1 kg. of $CaCO_3$, 0.8 kg. of $SIO_2$ and 37.7 kg. of $H_2O$.

This thick liquid was granulated and dehydrated in the granular drier 6 to give 221 kg. of anhydrous grains which were introduced in the decomposition reactor 8. From this reactor there were discharge 92 kg. of gaseous mixture which were recycled to the reactor 1 and 184.7 kg. of solid material of which 130 kg. were recycled to the mixer 5, while 54.7 kg. consisting of 51.4 kg. of $CaCO_3$, 1.9 kg. of $Ca_3(PO_4)_2$, 1.1 kg. of $CaP_2$ and 0.5 kg. of $SiO_2$, were discarded and dumped.

EXAMPLE 3

100 kg. of Florida calcium phosphate having the composition specified in Example 2 were introduced into the reactor 1 which was operated at 35° C. together with 92.8 kg. of 33.6% nitric acid, 134.6 kg. of the same gaseous mixture as used in Example 2, and 147.2 kg. of a solution (recovered from the decanter referred to below and referred to as the "aqueous phase") consisting of 0.75 kg. of $H_3PO_4$, 22.92 kg. of $Ca(H_2PO_4)_2$, 49.31 kg. of $Ca(NO_3)_2$, 6.56 kg. of $H_2SiF_6$, 51.33 kg. of $H_2O$ and 5.5 kg. of isobutanol.

The solution and the gas leaving the reactor 1 were recontacted in the reactor 2 which was also operated at 35° C. There were discharged from the reactor 2, 421.2 kg. of a solution consisting of 205.8 kg. of $Ca(NO_3)_2$, 13.4 kg. of $HNO_3$, 64 kg. of $H_3PO_4$, 6.8 kg. of $H_2SiF_6$, 2.7 kg. of $SiO_2$, 113 kg. of $H_2O$ and 5.5 kg. of isobutanol, and 52.7 kg. of a gaseous mixture identical to the off-gas from reactor 2 in Example 2. 30 kg. of $CO_2$ were added to this off-gas and it was then introduced into the decomposition reactor 8 which was operated at 600° C.

The solution discharged from the reactor 2 was cooled to 12° C. and separation of the crystals formed during cooling gave 190.4 kg. of calcium nitrate tetrahydrate identical to that of Example 2 and 230.8 kg. of mother liquor consisting of 74.6 kg. of $Ca(NO_3)_2$, 11.8 kg. of $HNO_3$, 62.3 kg. of $H_3PO_4$, 6.6 kg. of $H_2SiF_6$, 2.7 kg. of $SiO_2$, 58.5 kg. of $H_2O$ and 5.5 kg. of isobutanol.

The mother liquor was mixed in an agitated reactor with 260.3 kg. of a solvent consisting of 244.7 kg. of isobutanol and 15.6 kg. of $H_2O$. The mixture was then passed into a dectanter from which were recovered 147.2 kg. of aqueous phase that was recycled to reactor 1 and and 343.8 kg. of organic phase consisting of 41.6 kg. of $H_3PO_4$, 24 kg. of $HNO_3$, 9 kg. of $Ca(NO_3)_2$, 0.02 kg. of $H_2SiF_6$, 22.8 kg. of $H_2O$ and 244.6 kg. of isobutanol.

42.1 kg. of 60% nitric acid were added to this organic phase and the whole was neutralised with 21.4 kg. of ammonia. The neutralised solution was decanted. 259.7 kg. of solvent were recovered and recycled after the addition of 0.6 kg. of isobutanol. At the same time 147.5 kg. of aqueous solution were recovered and then granulated. After drying there were obtained 123.9 kg. of granulated 24-24-0 fertiliser, in which 84% of the $P_2O_5$ was water-soluble and 16% soluble in ammonium citrate.

The 190.4 kg. of calcium nitrate crystals obtained from the separator were introduced into the mixer 5 together with 190.4 kg. of crushed solid material identical to that used in Example 2. The mixer was operated at 80° C. 1.97 kg. of $CO_2$ were given off and 378.8 kg. of thick liquid were produced which were granulated and dehydrated in the granulator-drier 6 to give 323.6 kg. of anhydrous grains identical to those of Example 2, which were then introduced into the decomposition reactor 8. From this reactor there were discharged 134.6 kg. of a gaseous mixture which was recycled to the reactor 1 and 270.5 kg. of solid material, of which 190.4 kg. were recycled to the mixer 5, while 80.1 kg. consisting of 75.24 kg. of $CaCO_3$, 2.77 kg. of $Ca_3(PO_4)_2$, 1.64 kg. of $CaF_2$ and 0.42 kg. of $SiO_2$ were discarded and dumped.

We claim:
1. A process for the production of nitrophosphate fertilizers, which comprises the steps of:
 (i) digesting in a first reactor a naturally occurring calcium oxide containing calcium phosphate with aqueous nitric acid having a concentration of from 10 to 50% in the presence of a gas containing nitrogen oxides recycled from step (viii) of the process, the amount of nitric acid being about 0.2-1.3 moles per mole of calcium oxide in the calcium phosphate, completing the digesting in a second reactor connected in series with said first reactor, the temperature in said first reactor being from 20 to 60° C. and in said second reactor being about 90° C., the temperature in said second reactor being sufficient to free substantially all of the fluorine in said digest solution;
 (ii) cooling the solution obtained by said acid digestion to crystallize calcium nitrate contained therein as calcium nitrate tetrahydrate;
 (iii) separating the crystallized calcium nitrate tetrahydrate from the mother liquor containing the same;
 (iv) neutralizing, concentrating and granulating the mother liquor to form a nitrophosphate fertilizer therefrom;
 (v) melting the separated calcium nitrate tetrahydrate and mixing crushed calcium carbonate therewith to disperse the calcium nitrate tetrahydrate therein;
 (vi) dehydrating and granulating the mixture obtained in step (v);

(vii) thermally decomposing, at a temperature from 440° C. to 750° C., the granulated dehydrated mixture in the presence of the off-gas from the said second reactor employed in digestion step (i), said off-gas containing carbon dioxide which has been added thereto; and (viii) recycling the nitrogen oxide-containing off-gas from the decomposition step (vii) to the said first reactor employed in digestion step (i).

2. The process of claim 1, wherein the aqueous nitric acid used in the digestion step (i) has a concentration of about 35%.

3. The process of claim 1, wherein the off-gas from the decomposition step (vii) is condensed to form a nitrogen oxide-containing gas phase and a nitrogen oxide-containing liquid phase which are passed separately to the digestion step (i).

References Cited

UNITED STATES PATENTS

| 1,854,291 | 4/1932 | Burdick | 71—39 |
| 2,134,013 | 10/1938 | Turrentine | 71—39 |
| 2,211,918 | 8/1940 | Turrentine | 71—39 X |
| 3,560,149 | 2/1971 | Markey et al. | 71—39 X |

OTHER REFERENCES

Hackh's Chemical Dictionary, 3rd edition, 1944, p. 157, published by The Blakiston Co., Philadelphia.

REUBEN FRIEDMAN, Primary Examiner

B. H. LEVENSON, Assistant Examiner

U.S. Cl. X.R.

71—39, 50, 60